(12) United States Patent
Baird et al.

(10) Patent No.: US 7,982,160 B2
(45) Date of Patent: Jul. 19, 2011

(54) PHOTONIC CLOCK STABILIZED LASER COMB PROCESSING

(75) Inventors: Brian W. Baird, Portland, OR (US); Kelly J. Bruland, Portland, OR (US); Clint Vandergiessen, Beaverton, OR (US); Mark A. Unrath, Portland, OR (US); Brady Nilsen, Beaverton, OR (US); Steve Swaringen, Rockwall, TX (US)

(73) Assignee: Electro Scientific Industries, Inc., Portland, OR (US)

( * ) Notice: Subject to any disclaimer, the term of this patent is extended or adjusted under 35 U.S.C. 154(b) by 771 days.

(21) Appl. No.: 12/060,199

(22) Filed: Mar. 31, 2008

(65) Prior Publication Data

US 2009/0242531 A1    Oct. 1, 2009

(51) Int. Cl.
*B23K 26/36*     (2006.01)
*H01L 21/768*    (2006.01)
*H01L 21/77*     (2006.01)

(52) U.S. Cl. ......... 219/121.68; 219/121.69; 219/121.78; 438/795

(58) Field of Classification Search ............. 219/121.68, 219/121.69, 121.78, 121.81; 438/795
See application file for complete search history.

(56) References Cited

U.S. PATENT DOCUMENTS

| | | | |
|---|---|---|---|
| 5,453,594 A | | 9/1995 | Konecny |
| 5,676,866 A | | 10/1997 | in den Baumen et al. |
| 5,731,047 A | * | 3/1998 | Noddin .................. 427/555 |
| 5,841,099 A | * | 11/1998 | Owen et al. ............ 219/121.69 |
| 6,172,325 B1 | | 1/2001 | Baird et al. |
| 6,538,298 B1 | | 3/2003 | Weingarten et al. |
| 6,559,412 B2 | | 5/2003 | Lauer et al. |
| 6,574,250 B2 | | 6/2003 | Sun et al. |
| 6,760,356 B2 | | 7/2004 | Erbert et al. |
| 6,947,454 B2 | | 9/2005 | Sun et al. |
| 6,979,798 B2 | | 12/2005 | Gu et al. |
| 7,223,937 B2 | | 5/2007 | Nagai et al. |
| 7,394,476 B2 | * | 7/2008 | Cordingley et al. .......... 347/224 |

(Continued)

FOREIGN PATENT DOCUMENTS

JP      01-289586 A1    11/1989

(Continued)

OTHER PUBLICATIONS

Notification of Transmittal of the International Search Report and The Written Opinion of the International Searching Authority, or the Declaration for International Application No. PCT/US2009/038170, filed Mar. 25, 2009.

*Primary Examiner* — Samuel M Heinrich
(74) *Attorney, Agent, or Firm* — Stoel Rives LLP

(57) ABSTRACT

Processing a workpiece with a laser includes generating laser pulses at a first pulse repetition frequency. The first pulse repetition frequency provides reference timing for coordination of a beam positioning system and one or more cooperating beam position compensation elements to align beam delivery coordinates relative to the workpiece. The method also includes, at a second pulse repetition frequency that is lower than the first pulse repetition frequency, selectively amplifying a subset of the laser pulses. The selection of the laser pulses included in the subset is based on the first pulse repetition frequency and position data received from the beam positioning system. The method further includes adjusting the beam delivery coordinates using the one or more cooperating beam position compensation elements so as to direct the amplified laser pulses to selected targets on the workpiece.

21 Claims, 11 Drawing Sheets

U.S. PATENT DOCUMENTS

| | | |
|---|---|---|
| 2002/0167581 A1 | 11/2002 | Cordingley et al. |
| 2003/0091097 A1 | 5/2003 | Yap et al. |
| 2003/0102291 A1 | 6/2003 | Liu et al. |
| 2005/0056626 A1 | 3/2005 | Gross et al. |
| 2005/0067388 A1 | 3/2005 | Sun et al. |
| 2005/0100062 A1* | 5/2005 | Grant et al. .................... 372/10 |
| 2005/0270629 A1 | 12/2005 | Johnson |
| 2006/0159138 A1 | 7/2006 | Deladurantaye et al. |
| 2006/0191884 A1 | 8/2006 | Johnson et al. |

FOREIGN PATENT DOCUMENTS

| | | |
|---|---|---|
| WO | 2008014331 A2 | 1/2008 |

* cited by examiner

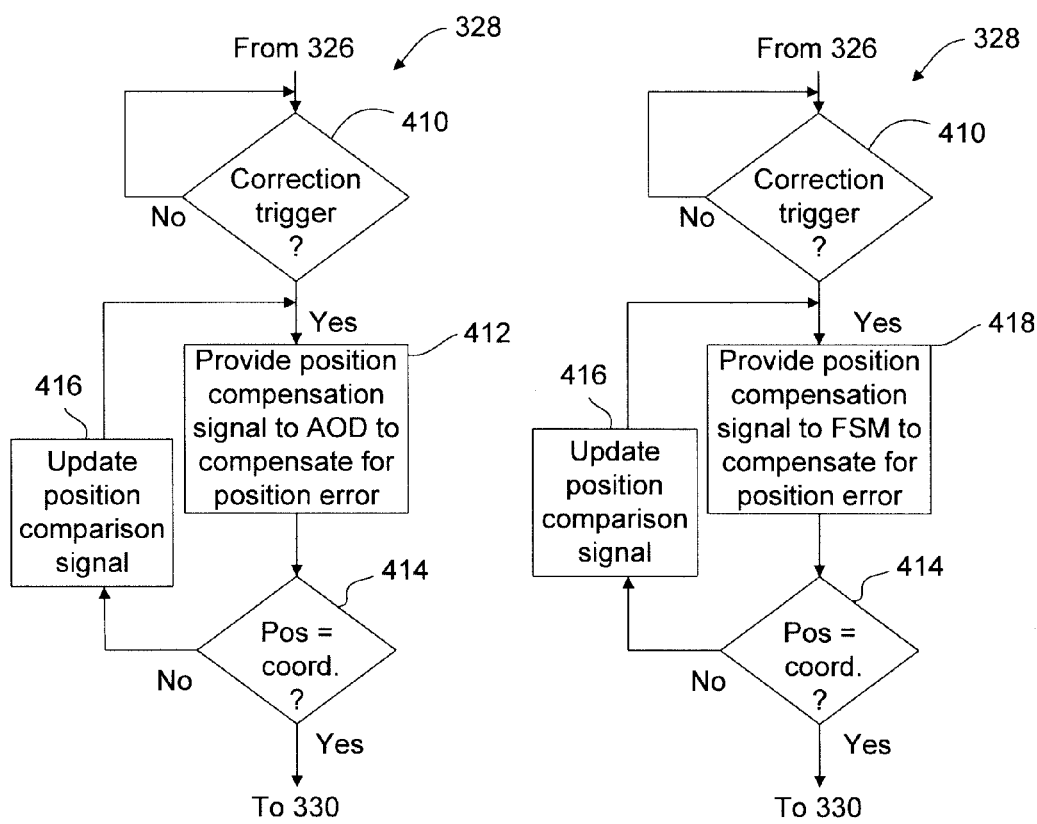

PHOTONIC CLOCK STABILIZED LASER COMB PROCESSING

TECHNICAL FIELD

This disclosure relates to laser processing systems. In particular, this disclosure relates to systems and methods for synchronizing selection of pulses for amplification and alignment with workpiece targets based on a photonic clock and position data.

BACKGROUND INFORMATION

Lasers may be used in a variety of industrial operations including inspecting, processing, and micro-machining substrates, such as electronic materials. For example, to repair a dynamic random access memory ("DRAM"), a first laser pulse is used to remove an electrically conductive link to a faulty memory cell of a DRAM device, and then a second laser pulse is used to remove a resistive link to a redundant memory cell to replace the faulty memory cell. Because faulty memory cells needing link removals may be randomly located, workpiece positioning delay times typically require that such laser repair processes be performed over a wide range of interpulse times, rather than at a single interpulse time.

Banks of links to be removed are typically arranged on the wafer in a straight row. The links are generally processed in a link run. During a link run, the laser beam is pulsed as a stage positioner passes the row of links across the location of a focused laser spot. The stage typically moves along a single axis at a time and does not stop at each link position. This production technique is referred to in the industry as on-the-fly ("OTF") link processing and allows for greater efficiency in the rate at which links on a given wafer can be repaired, thereby improving the efficiency of the entire DRAM production process.

As laser pulse repetition frequencies (PRFs) and link run velocities increase, more demands are placed on the stage positioner. Stage acceleration and velocity are not increasing as fast as laser PRFs. Thus, it may be difficult to take the most advantage of forthcoming high PRF lasers (e.g., PRFs in the hundreds of kHz or MHz ranges).

Generally, the current true utilization of laser pulses in a link processing system is quite low. For example, a typical wafer including approximately 600,000 links may be processed in approximately 600 seconds. This represents an effective blow rate of 1 kHz. If this example wafer processing system uses a laser source with a 100 kHz PRF, only about one out of every hundred possible laser pulses reaches the surface of the wafer.

Dual-beam and multi-beam laser systems generally use complex laser optical subassemblies and are generally expensive to construct. Further, recent advances in laser design present problems with this approach. For example, certain high power, short pulse-width (e.g., on the order of picoseconds or femtoseconds) lasers are based on a master oscillator-power amplifier (MOPA) approach in which a mode-locked laser oscillator provides stable seed pulses at repetition rates in a range between approximately 10 MHz and approximately 100 MHz. These laser oscillators may be actively or passively mode-locked. An actively locked oscillator may permit some adjustment of its output pulse phase and/or frequency for timing purposes. However, in a passively mode-locked master oscillator, the output frequency may not be so easily modified. Thus, the laser processing system synchronizes its operation with the fundamental frequency provided by the passively mode-locked master oscillator.

A power amplifier (e.g., a diode-pumped optical gain medium) amplifies selected pulses from the master oscillator. As in typical diode-pumped Q-switched lasers, the energy of these amplified pulses is a function of the interpulse period. The true operating repetition rate (e.g., the frequency of pulses issued from the power amplifier) is typically a submultiple of the fundamental (e.g., master oscillator) repetition rate, and is typically about 10 to 1000 times lower than the master oscillator frequency.

For desired laser operation, the laser should fire at a constant repetition rate, with the beam positioning subsystem slaved to the laser's pulse timing. However, achieving such beam position timing while maintaining pulse placement accuracy may be quite difficult. For example, the timing window for the repetition rates mentioned above may be in a range between approximately 10 nanoseconds and approximately 100 nanoseconds. Servo control systems typically cannot guarantee high-accuracy (e.g., within 10 nm) pulse placement within such small, fixed timing windows.

Many industrial laser processing applications (such as link cutting in memory device redundancy circuits, micro-via drilling, component trimming, and material cutting or scribing) emit a high-energy laser pulse in coordination with a motion control system that positions the laser pulse on a workpiece. This coordination often uses precise timing, and depending on the motion profile of the working beam, this timing may be arbitrary. While the timing precision is used to maintain the accuracy of the processing system, the arbitrary timing of pulse commands can degrade aspects of laser performance, such as pulse width and peak power.

Many laser processing system designs have incorporated Q-switched lasers to obtain consistent pulse energies at a high pulse repetition rate. However, such lasers may be sensitive to the value of (and variation in) the interpulse period. Thus, pulse width, pulse energy, and pulse amplitude stability may vary with changes in the interpulse period. Such variations may be static (e.g., as a function of the interpulse period immediately preceding a pulse) and/or dynamic (e.g., as a function of the interpulse period history). This sensitivity is generally reduced or minimized by operating the laser processing system such that the laser is fired at a nominal repetition rate (typically below 200 kHz), with minor repetition rate deviations producing acceptable deviations in pulse characteristics.

Such an approach has typically been accomplished by controlling the desired beam trajectory such that the laser may be fired "on-demand" at the appropriate workpiece location (or to hit the location with a pulse based on known factors such as stage velocity, propagation delay, pulse build up time, and other delays) to maintain the desired pulse placement accuracy. The workpiece locations are sequenced such that the repetition rate is approximately constant. "Dummy" workpiece locations may be inserted in the processing commands to account for laser stability issues. The "dummy" workpiece locations keep the repetition rate approximately constant during idle periods, with the "dummy" pulses blocked from the workpiece by beam modulation devices such as mechanical shutters, acousto-optic modulators (AOMs), and electro-optic modulators (EOMs).

SUMMARY OF THE DISCLOSURE

In one embodiment, a method for processing a workpiece with a laser includes generating laser pulses at a first pulse repetition frequency. The first pulse repetition frequency provides reference timing for coordination of a beam positioning system and one or more cooperating beam position compensation elements to align beam delivery coordinates relative to the workpiece. The method also includes, at a second pulse repetition frequency that is lower than the first pulse repetition frequency, selectively amplifying a subset of the laser pulses. The selection of the laser pulses included in the subset may be based on the first pulse repetition frequency and position data received from the beam positioning system. The method further includes adjusting the beam delivery coordinates using the one or more cooperating beam position compensation elements so as to direct the amplified laser pulses to selected targets on the workpiece.

In certain embodiments, the method may also include measuring a position of the beam positioning system, comparing the measured position to an expected position, and providing the comparison as a position compensation signal. Adjusting the beam delivery coordinates may include adjusting at least one of an acousto-optic deflector, an electro-optic deflector, and a fast steering mirror based on the position compensation signal.

In certain embodiments, the method may also include selecting the second pulse repetition frequency such that the first pulse repetition frequency is an integer multiple "n" of the second pulse repetition frequency. Adjusting the beam delivery coordinates includes offsetting an interpulse time between a first amplified pulse in the subset and a second amplified pulse in the subset by an integer multiple k of the photonic oscillator interpulse time based on the amount of beam delivery coordinate adjustment. A second amplifier may block the second amplified pulse from reaching the workpiece.

A system for processing a workpiece with a beam of laser pulses includes a beam positioning system to align beam delivery coordinates relative to the workpiece. The beam positioning system generates position data corresponding to the alignment. The system also includes one or more cooperating beam position compensation elements to adjust the alignment of the beam delivery coordinates based on the position data, and a pulsed laser source. The pulsed laser source includes a photonic oscillator to emit laser pulses at a first pulse repetition frequency. The first pulse repetition frequency provides a reference timing signal for coordination of the beam positioning system and the one or more cooperating beam position compensation elements for the alignment of the beam delivery coordinates relative to the workpiece. The pulsed laser source also includes a first optical modulator to select, at a second pulse repetition frequency that is lower than the first pulse repetition frequency, a subset of the laser pulses for amplification. The selection of the laser pulses included in the subset may be based on the first pulse repetition frequency and the position data Additional aspects and advantages will be apparent from the following detailed description of preferred embodiments, which proceeds with reference to the accompanying drawings.

BRIEF DESCRIPTION OF THE DRAWINGS

FIGS. 4A, 4B, 4C, and 4D are flow charts illustrating a few example methods for compensating for position errors according to certain embodiments.

DETAILED DESCRIPTION OF PREFERRED EMBODIMENTS

Figure 1:
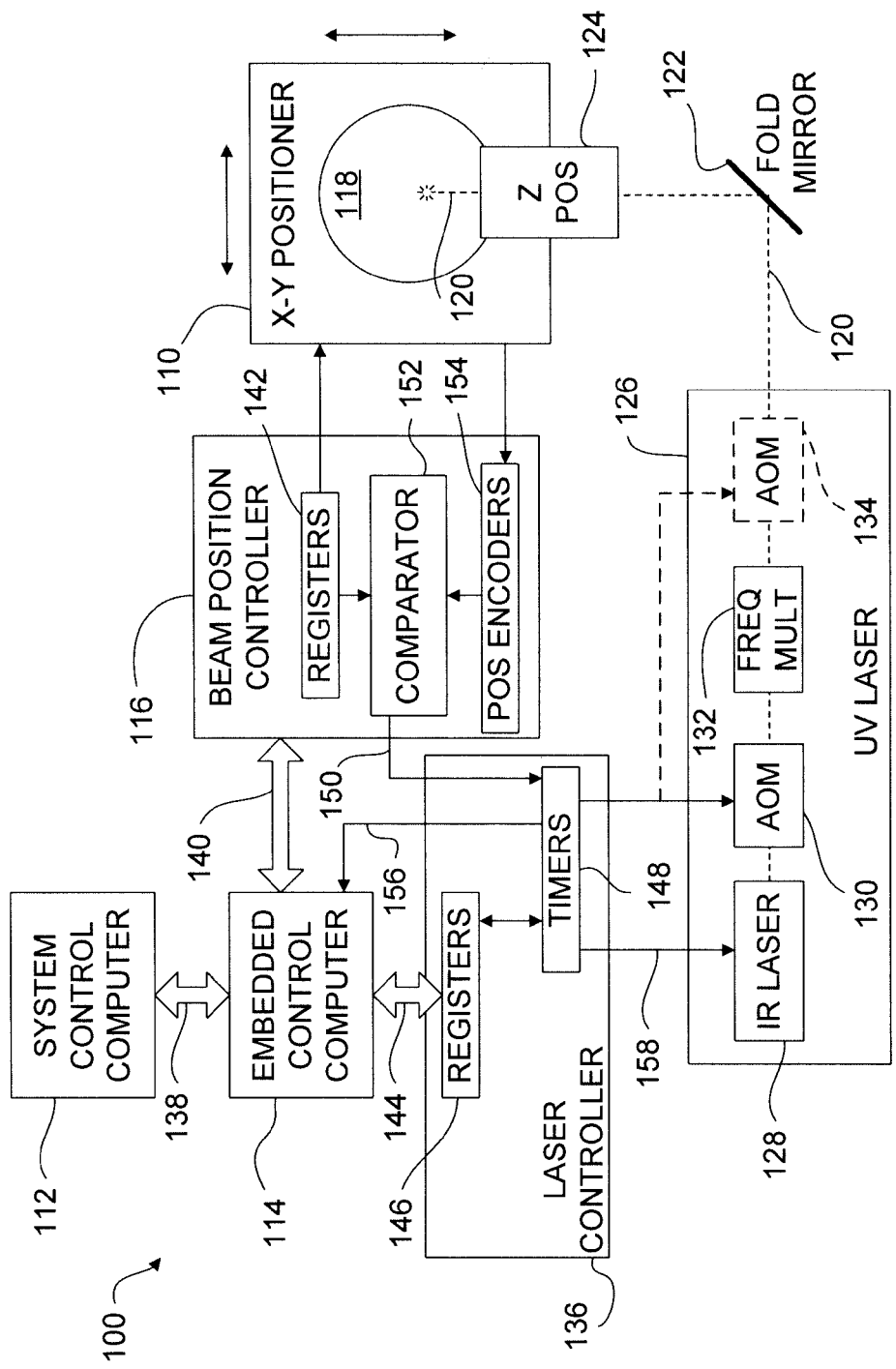
FIG. 1 is a block diagram of a conventional laser pulse processing control system including a workpiece (X-Y) positioner.

In one embodiment, a photonic clock is used as a master timing element to coordinate beam positioner control elements in a laser processing system. The photonic clock may be a pulsed output from a photonic oscillator in a pulsed laser source. The photonic oscillator may be a seed oscillator or a master oscillator. The beam positioner control elements use timing signals from the photonic oscillator to synchronize the alignment of target structures on a workpiece with the emission of laser pulses from the laser system. One or more pulses from the laser source are transmitted through the optical elements of a laser system to process the target structures. Pulses from the laser source may be amplitude divided to create arrays of pulses for processing the target structures.

The laser systems and methods disclosed herein may be used to process a wide variety of workpiece targets. For example, certain embodiments may be used to sever electrically conductive link structures in a wide array of semiconductor memory devices, including DRAM, SRAM, and flash memory; to produce laser drilled micro-vias in flexible circuits, such as copper/polyamide layered materials, and in integrated circuit (IC) packages; to accomplish laser processing or micromachining of semiconductors, such as laser scribing or dicing of semiconductor integrated circuits, silicon wafers, and solar cells; and to accomplish laser micromachining of metals, dielectrics, polymeric materials, and plastics. One skilled in the art will recognize that many other types of workpieces and/or workpiece structures may be processed according to the embodiments disclosed herein.

Reference is now made to the figures in which like reference numerals refer to like elements. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

I. Typical Synchronization of Triggerable Laser Sources

In a typical laser processing system, timing signals are used to trigger a laser source to emit a laser pulse at an appropriate time (e.g., based on stage velocity, system delays, and other parameters) to illuminate a target on a workpiece with the laser pulse. For example, FIG. 1 is a block diagram of a conventional laser pulse processing control system 100 including a workpiece (X-Y) positioner 110. A similar system is described in U.S. Pat. No. 6,172,325, by Baird et al., which is assigned to the assignee of the present application. The system 100 includes a system control computer 112 and an embedded control computer 114 that interact to control a beam position controller 116. The beam position controller 116 receives position information from the X-Y positioner 110, which positions a workpiece 118 relative to an ultraviolet (UV) laser beam 120. The UV laser beam 120 may propagate through various optical elements (not shown) in addition to a fold mirror 122 that is shown. The X-Y positioner 110 may also include a Z positioner 124 that may be coupled to either the X or Y stage.

A UV laser system 126 includes a Q-switched solid state infrared (IR) laser 128, such as a diode-pumped, acousto-optically Q-switched Nd:YV0$_4$ laser. The UV laser system 126 also includes an acousto-optic modulator (AOM) 130 for modulating the pulse amplitude of the IR laser 128, and a frequency multiplier 132 for converting the infrared wavelength emissions from the IR laser 128 into green and/or UV wavelengths by employing well-known second, third, or fourth harmonic conversion processes. The AOM 130 may be alternatively positioned after the frequency multiplier 132 as indicated by the position of an AOM 134 shown in phantom lines. In either embodiment, a laser controller 136 controls the transmissivity of the AOM 130 (or the AOM 134) to transmit or block the UV laser beam 120 directed toward the workpiece 118.

The system control computer 112 communicates position coordinates of processing locations on the workpiece 118 across a bus 138 to the embedded control computer 114. In a typical specimen processing application, the workpiece 118 includes regularly spaced apart targets or device structures, such as fusible links, only some of which are laser processed. The locations processed by the UV laser beam 120 are referred to as target locations, and the locations that are not processed by the UV laser beam 120 are referred to as intermediate locations. The embedded control computer 114 adds to the target location coordinates the intermediate location coordinates that are spaced apart to the IR laser 128 at nearly equal time intervals. The embedded control computer 114 conveys the target and intermediate position coordinates one at a time at a predetermined rate across a bus 140 to registers 142 in the beam position controller 116 and simultaneously loads control data across a bus 144 to registers 146 in the laser controller 136. The predetermined rate controls the movement velocity of the X-Y controller 110, and the control data indicate whether the coordinate location is a target location to be processed and further includes mode and timing information.

The laser controller 136 operates timers 148 in either an autopulse mode or a pulse-on-position mode. In the autopulse mode, the timers 148 start in response to the control data in the registers 146. In the pulse-on-position mode, the timers 148 start in response to receiving a position coincidence signal 150 from a comparator 152 in the beam position controller 116. Position encoders 154 in the beam position controller 116 indicate to the comparator 152 the current position of the X-Y positioner 110, and when the current position matches the position coordinates stored in the registers 142, the position coincidence signal 150 is generated to indicate that the workpiece 118 is properly positioned relative to a target position or an intermediate position. Accordingly, if the workpiece 118 has been positioned relative to a target position, the timers 148 simultaneously operate the Q-switch in the IR laser 128 (through a Q-switch gating line 158) and set the AOM 130 to a transmissive state until a cycle done interrupt 156 is conveyed from the timers 148 to the embedded control computer 114. The transmissivity of the AOM 130 is controllable as either a laser pulse gating device or as a pulse amplitude modulator. Thus, the IR laser 128 may be triggered "on-demand" to process desired targets on the workpiece 118.

II. Example System Using Photonic Clock Synchronization

Photonic oscillators may be used in ultrafast laser systems to emit pulses in a nominally fixed frequency comb. Unlike the system 100 discussed above, however, photonic oscillators are not directly triggerable to produce pulses "on-demand." Rather, the photonic oscillators provide pulses at discrete time intervals at a known photonic oscillator frequency $f_{osc}$. Thus, in certain embodiments disclosed herein, a laser control system uses a clock derived from the light pulse output emitted by the photonic oscillator at a first PRF, $f_{osc}$. The laser control system uses workpiece position data and timing information from the photonic oscillator clock to select pulses from the frequency comb for amplification to a produce process frequency $f_p$ at a second PRF; to further select pulses emitted at the process frequency $f_p$ to transmit towards selected workpiece targets; and to control a beam positioning system and/or cooperating beam positioning compensation elements to direct the selected pulses to workpiece targets.

Figure 2:
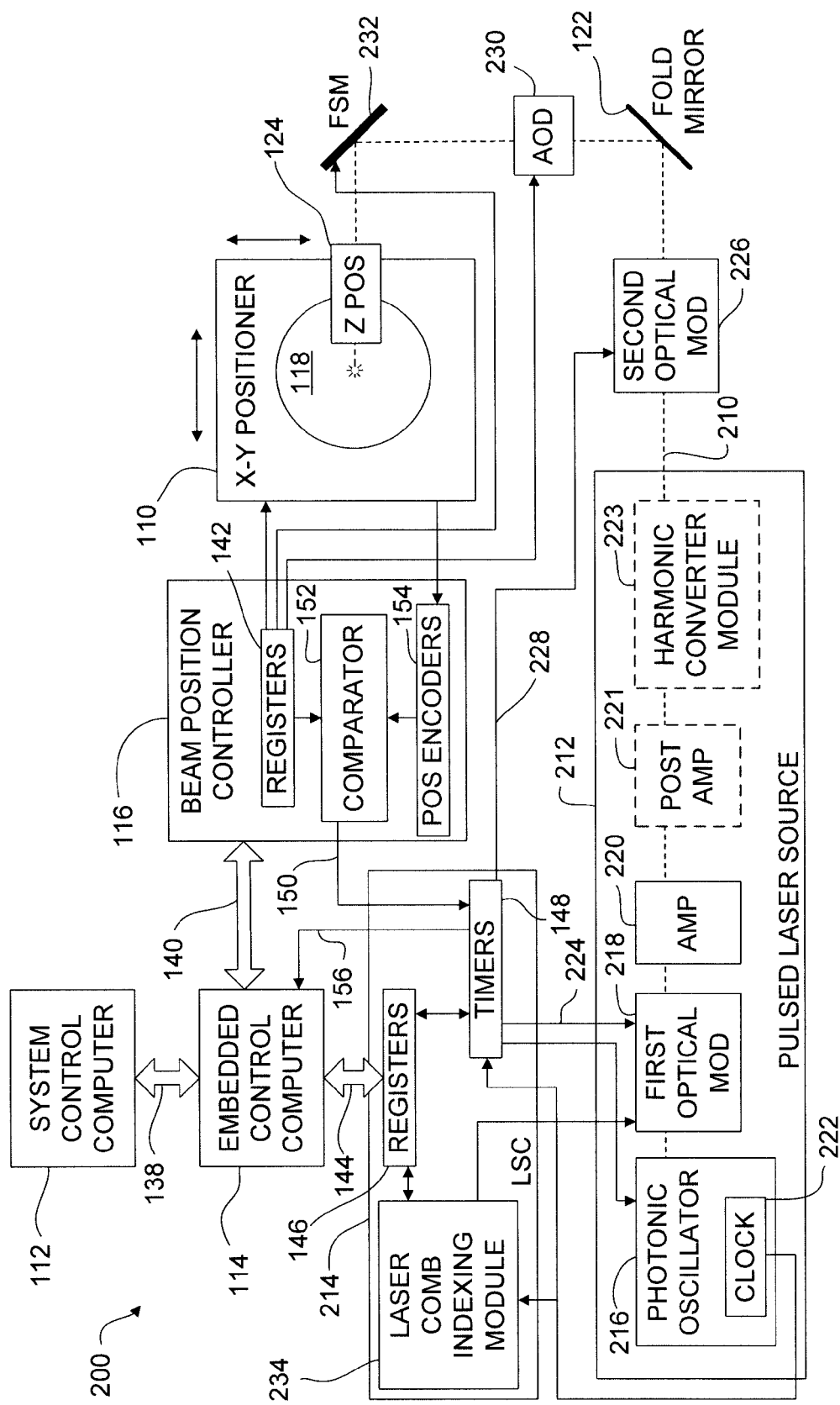
FIG. 2 is a block diagram of a laser pulse processing system according to one embodiment.

FIG. 2 is a block diagram of a laser pulse processing system 200 according to one embodiment. Similar to the system 100 shown in FIG. 1, the system 200 includes an X-Y positioner 110, a system control computer 112, an embedded control computer 114, and a beam position controller 116. The beam position controller 116 receives position information from the X-Y positioner 110, which positions a workpiece 118 relative to a laser beam 210. Although not shown, the laser beam 210 may propagate through various optical elements along a laser beam path to a fold mirror 122 that redirects the laser beam 210 toward the workpiece 118. The X-Y positioner 110 may also include a Z positioner 124 that may be coupled to either the X or Y stage.

The system control computer 112 communicates position coordinates of processing locations on the workpiece 118 across a bus 138 with the embedded control computer 114. In one embodiment, the workpiece 118 includes regularly spaced apart device structures, such as fusible links, only some of which are laser processed. As discussed above, the locations processed by the laser beam 210 are referred to as target locations, and the locations that are not processed by the laser beam 210 are referred to as intermediate locations.

The system 200 also includes a pulsed laser source 212 and a laser subsystem controller 214 (shown as "LSC"). As shown in FIG. 2, in one embodiment, the pulsed laser source 212 includes a photonic oscillator 216, a first optical modulator 218, and an amplifier 220. The pulsed laser source 212 may also include a post amplifier 221 and a harmonic converter module 223. In one embodiment, the photonic oscillator 216 is a mode-locked oscillator as described in U.S. Pat. No. 6,574,250, by Sun et al., which is assigned to the assignee of the current application. In such an embodiment, the pulsed laser source 212 is a mode-locked pulsed laser. Alternatively, the photonic oscillator 216 may be a semiconductor absorbing mirror passively mode-locked oscillator as taught in U.S. Pat. No. 6,538,298 by Weingarten, et al. Those skilled in the art will appreciate that other oscillators may also be used.

The first optical modulator 218 may be, for example, an acousto-optic modulator (AOM), an electro-optic modulator (EOM), or other optical modulator known in the art. The amplifier 220 and/or the post amplifier 221 may include, for example, an optically pumped gain medium. The harmonic converter module 223 may include nonlinear crystals for the conversion of an incident output pulse to a higher harmonic frequency through the well-known method of harmonic conversion.

A photonic clock 222 in the photonic oscillator 216 provides pulse timing data to the embedded control computer 114 by way of the laser subsystem controller 214. Using the pulse timing data, the embedded control computer 114 adds the intermediate location coordinates that are spaced apart to the target location coordinates to create a vector process comb. The vector process comb represents a matrix of target and intermediate target vector coordinates. The embedded control computer 114 sends the vector process comb through a bus 140 to registers 142 in the beam position controller 116. The laser subsystem controller 214 and the beam position controller 116 use the vector process comb to synchronize the X-Y positioner 110, in further coordination with cooperating beam position compensation elements described below, with pulses emitted by the pulsed laser source 212.

As discussed in detail below, the photonic oscillator 216 emits a beam of laser pulses at a first PRF, $f_{OSC}$. The first optical modulator 218 selects a subset of the pulses from the photonic oscillator 216 to pass to the amplifier 220 for amplification and subsequent output by the pulsed laser source 212. The output of the first optical modulator 218 is at a second PRF, $f_P$. The selection of pulses by the first optical modulator 218 is based on a signal from the clock 222 and position data received from the beam position controller 116.

The system also includes a second optical modulator 226 used to increase stability of the pulses provided to the workpiece 118. In one embodiment, timers 148 in the laser subsystem controller 214 control the second optical modulator 226 to transmit a pulse from the pulsed laser source 212 based on timing data. Like the first optical modulator 218, the second optical modulator 226 may be an AOM, an EOM, or another known optical modulating device. Although shown external to the pulsed laser source 212, an artisan will recognize from the disclosure herein that the second optical modulator 226 may also be included within the pulsed laser source 212. In one embodiment, as described in U.S. Pat. No. 6,172, 325, by Baird et al., which is assigned to the assignee of the present application, the second optical modulator 226 is controllable as either a laser pulse gating device or as a pulse amplitude modulator. Also, as described in U.S. Pat. No. 6,947,454, by Sun et al., which is assigned to the assignee of the present application, the second optical modulator 226 may be pulsed at substantially regular and substantially similar repetition rates as that of the pulsed laser source 212.

The system 200 also includes beam position compensation elements to direct the amplified laser pulses to selected targets on the workpiece 118. The beam position compensation elements may include an acousto-optic deflector 230, a fast-steering mirror 232, a laser comb indexing module 234 discussed below, a combination of the foregoing, or other optical steering elements. One skilled in the art will recognize, for example, that an electro-optic deflector may also be used.

Control of the beam steering elements is based on the photonic clock 222 and position data received from the beam position controller 116.

III. Example Pulse Synchronization Method

Figure 3:
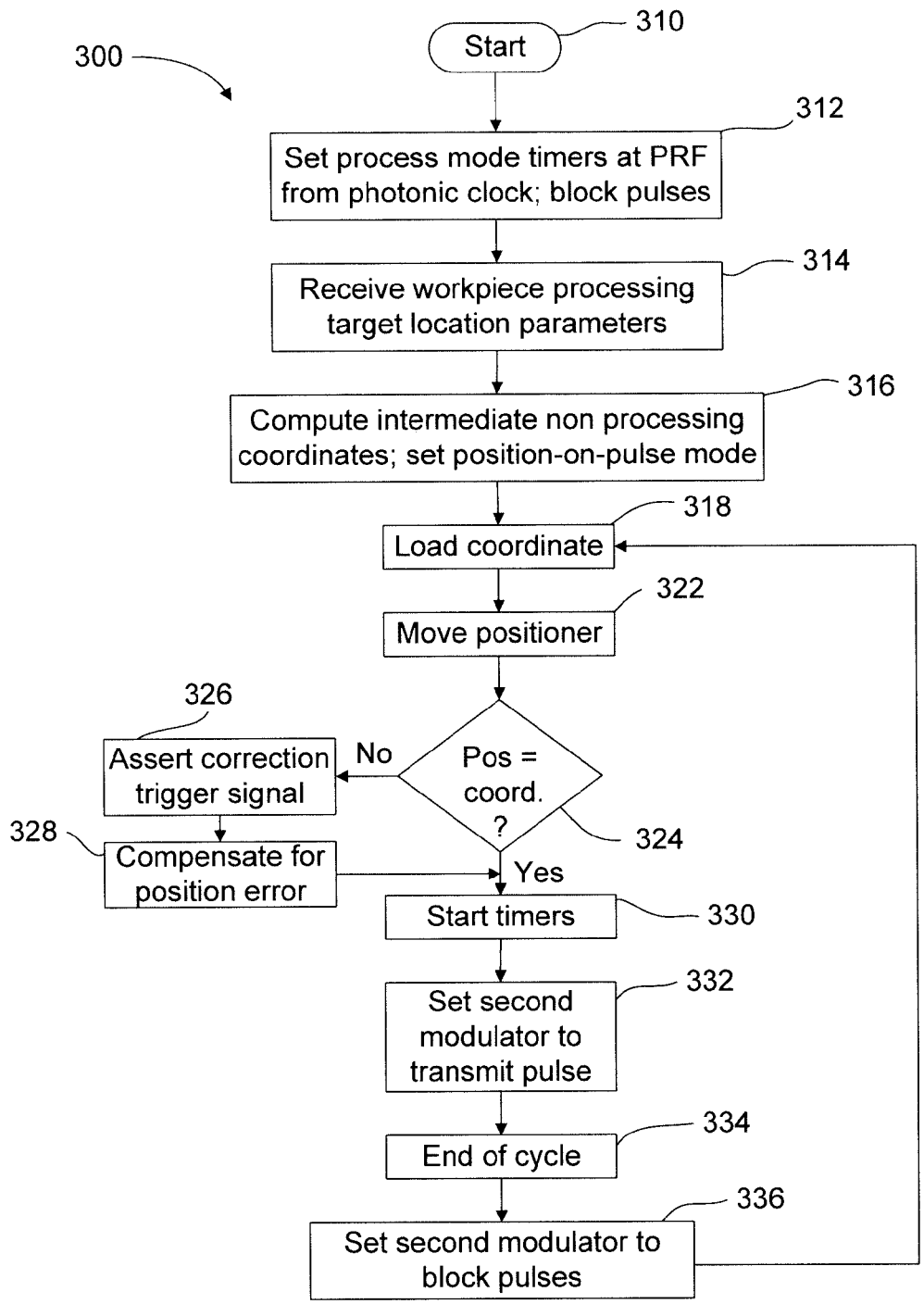
FIG. 3 is a flowchart illustrating a method for processing a workpiece using the system shown in FIG. 2 according to one embodiment.

FIG. 3 is a flowchart illustrating a method 300 for processing the workpiece 118 using the system 200 shown in FIG. 2 according to one embodiment. After starting 310, the method 300 includes setting 312 the timers 148 in the laser subsystem controller 214 in a process mode at a PRF determined by the clock 222 in the photonic oscillator 216. The timers 148 set pulse block signal 224, 228 to gate the first optical modulator 218 and the second optical modulator 226 off, thereby preventing a usable amount of energy emitted by the photonic oscillator 216 from reaching the workpiece 118.

When the system 200 prepares to initiate a position-on-pulse processing run, the embedded control computer 114 receives 314 from the system control computer 112 target location coordinates on the workpiece 118 to be processed. As discussed above, the photonic clock 222 in the oscillator module 216 provides the pulse timing data to the embedded control computer 114. Using the pulse timing data, the embedded control computer 114 computes 316 intermediate location coordinates of targets not requiring processing. The embedded control computer 114 adds the intermediate location coordinates to the target location coordinates to create a vector process comb. The vector process comb represents a matrix of target and intermediate target vector coordinates.

The embedded control computer 114 sets 316 the system 200 to a position-on-pulse mode. The embedded control computer 114 also loads 318 the vector process comb, representing the location coordinates through a bus 140 to registers 142 in the beam position controller 116 and selects a current location coordinate. Further, the embedded control computer 114 communicates position-on-pulse mode enabling data across a bus 144 to the laser subsystem controller 214. The timers 148 continue to set the pulse block signals 224, 228 to cause the first optical modulator 218 to block pulsed laser source 212 from transmitting pulse energy to the workpiece 118. The method 300 then moves 322 the beam positioner 110 in response to the current location coordinate.

The method 300 then queries 324 whether a measured position of the X-Y positioner matches, within accuracy limits, the expected position defined by the current location coordinate. Beam position encoders 154 in the beam position controller 116 indicate to the comparator 154 the current position of the X-Y positioner 110. The comparator 154 compares the data from the beam position encoders 154 to the current location coordinate stored in the registers 142. If the data and coordinate match within the predetermined limits, the comparator 154 activates a position coincidence signal 150.

If, however, the data and coordinate do not match within the predetermined limits, the comparator 154 asserts 326 a correction trigger signal (not shown). The method then compensates 328 for the position error. As discussed in detail below, this may be done by adjusting the beam positioning system (e.g., the X-Y positioner 110) and/or cooperating beam positioning compensating elements (e.g., the AOD 230 and/or the FSM 232), activating laser comb indexing, implementing a repetitive control algorithm through a resonator stage, a combination of one or more of the foregoing, and/or by other methods disclosed herein.

When the data and coordinate match within the predetermined limit, the method 300 starts 330 the timers 148. In one embodiment, the timers 148 set 332 the second optical modulator 226 to a transmissive state by applying a control signal that is substantially coincident with the output from the pulsed laser source 212 such that the second optical modulator 226 allows the pulse to be transmitted to the workpiece 118. The second optical modulator 226 remains in the transmissive state until an end 334 of cycle is reached, at which time the timers 148 again set 336 the second optical modulator 226 to a reduced transmissive state. In another embodiment, the second optical modulator 226 remains in a transmissive state for a pre-determined time sufficient to allow transmission of the pulse. At the conclusion of this predetermined time, the second optical modulator 226 returns to a reduced transmissive state. In either embodiment, after the second optical modulator 226 is in the reduced transmissive state, the method 300 returns to step 318 to continue with a next current coordinate position.

As discussed above, the first optical modulator 218 selects pulses to be amplified and provided to the second optical modulator at a PRF, $f_P$. As taught by Sun et al. in U.S. Pat. No. 6,947,454, which is assigned to the assignee of the present application, this technique results in a thermal loading of the second optical modulator 226 that remains substantially constant regardless of the incidence of working pulse requests. This resultant consistent loading on the second optical modulator 226 reduces or eliminates deterioration of the laser beam quality and laser beam pointing error associated with thermal loading variation. Variations in the pulse to pulse amplitude or the pulse to pulse energy may be sensed by a photodetection module (not shown) and dynamic or predictive corrections to a transmission level of the second optical modulator 226 may subsequently be controlled to reduce such pulse to pulse variations.

IV. Example Position Compensation Methods

As discussed above, the method 300 shown in FIG. 3 includes compensating 328 for position errors when a current position of the X-Y positioner 110 exceeds an expected position window. This may be accomplished in a number of different ways. FIGS. 4A, 4B, 4C, and 4D are flow charts illustrating a few example methods for compensating 328 for position errors after detecting 410 a correction trigger signal according to certain embodiments.

In FIG. 4A, the method 328 includes providing 412 the position compensation signal to a high-speed beam positioning element, such as the AOD 230 shown in FIG. 2, so as to adjust the position of the beam 210 with respect to the workpiece 118 on the X-Y positioner 110. As indicated above, an EOD may also be used. The position compensation signal may include a value indicating a direction and an amount of deflection that the AOD 230 is to provide. Such values may be provided by the comparator 154 and/or the position encoders 154 (e.g., through the laser subsystem controller 214), which determine the differences between the current position of the X-Y positioner 110 measured by the position encoders 154 and an expected position stored in the registers 142.

The method 328 may query 414 whether the adjustment provided by the AOD 230 is sufficient to compensate for the position error, and continue to update 416 the position compensation signal until the position of the beam 210 with respect to the workpiece 118 is within the predetermined limits. For example, although not shown in FIG. 2, the position of the laser beam 210 may be detected by a photodetection module that provides position correction feedback to the AOD 230.

In FIG. 4B, the method 328 includes providing 412 the position compensation signal to the FSM 232 shown in FIG. 2, so as to adjust the position of the beam 210 with respect to the workpiece 118 on the X-Y positioner 110. As with the embodiment shown in FIG. 4A, the position compensation signal may include a value indicating a direction and amount of deflection that the FSM 232 is to provide. Further, the method 328 may query 414 whether the adjustment provided by the FSM 232 is sufficient to compensate for the position error, and continue to update 416 the position compensation signal until the position of the beam 210 with respect to the workpiece 118 is within the predetermined limits.

Figures 4C, 4D:
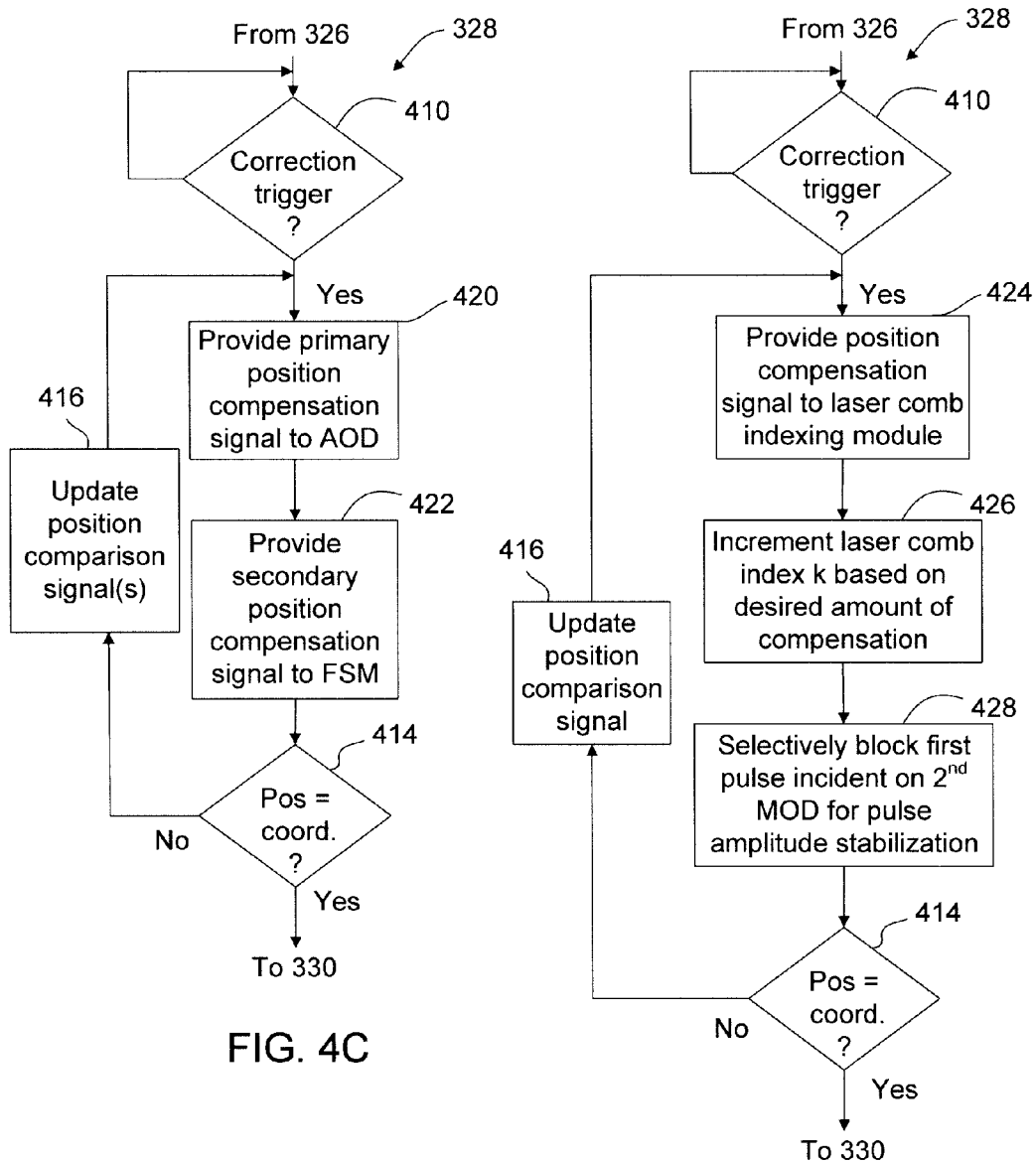

FIG. 4C is a combination of FIGS. 4A and 4B, wherein the method 328 includes providing 420 a primary position compensation signal to the AOD 230 and providing 422 a secondary position compensation signal to the FSM 232. Again, the method 328 may query 414 whether the adjustment provided by the AOD 230 and/or the FSM 232 is sufficient to compensate for the position error. The method 300 may update 416 one or both of the primary position compensation signal and the secondary position compensation signal until the position of the beam 210 with respect to the workpiece 118 is within the predetermined limits. In one embodiment, the method 329 first updates the primary position compensation signal, determines whether the additional adjustment is sufficient, and if not, also updates the secondary position compensation signal. This sequence may be repeated until the position of the beam 210 with respect to the workpiece 118 is within the predetermined limits.

In FIG. 4D, the method 328 includes providing 424 the position compensation signal to the laser comb indexing module 234. The laser comb indexing module 234 changes 426 a laser comb index k in the vector process comb based on a desired amount of compensation (e.g., the amount indicated by the position compensation signal). The laser pulse index k is an integer value used to determine which pulses from the photonic oscillator 216 to transmit from the pulsed laser source 212 using the first optical modulator 218. As discussed below with reference to FIG. 5, the laser comb index k is applied by incrementing or decrementing a second frequency comb ($f_P$) to produce an offset frequency comb ($f_P'$). In the example shown, the laser comb indexing module 234 commands the laser comb index k to an offset of 1 (k=1) following selection by the first optical modulator 218 photonic oscillator pulse number m=1, thereby resulting in subsequent amplification of the photonic oscillator pulse number m=12 in offset process frequency comb $f_P'$.

Figure 5:
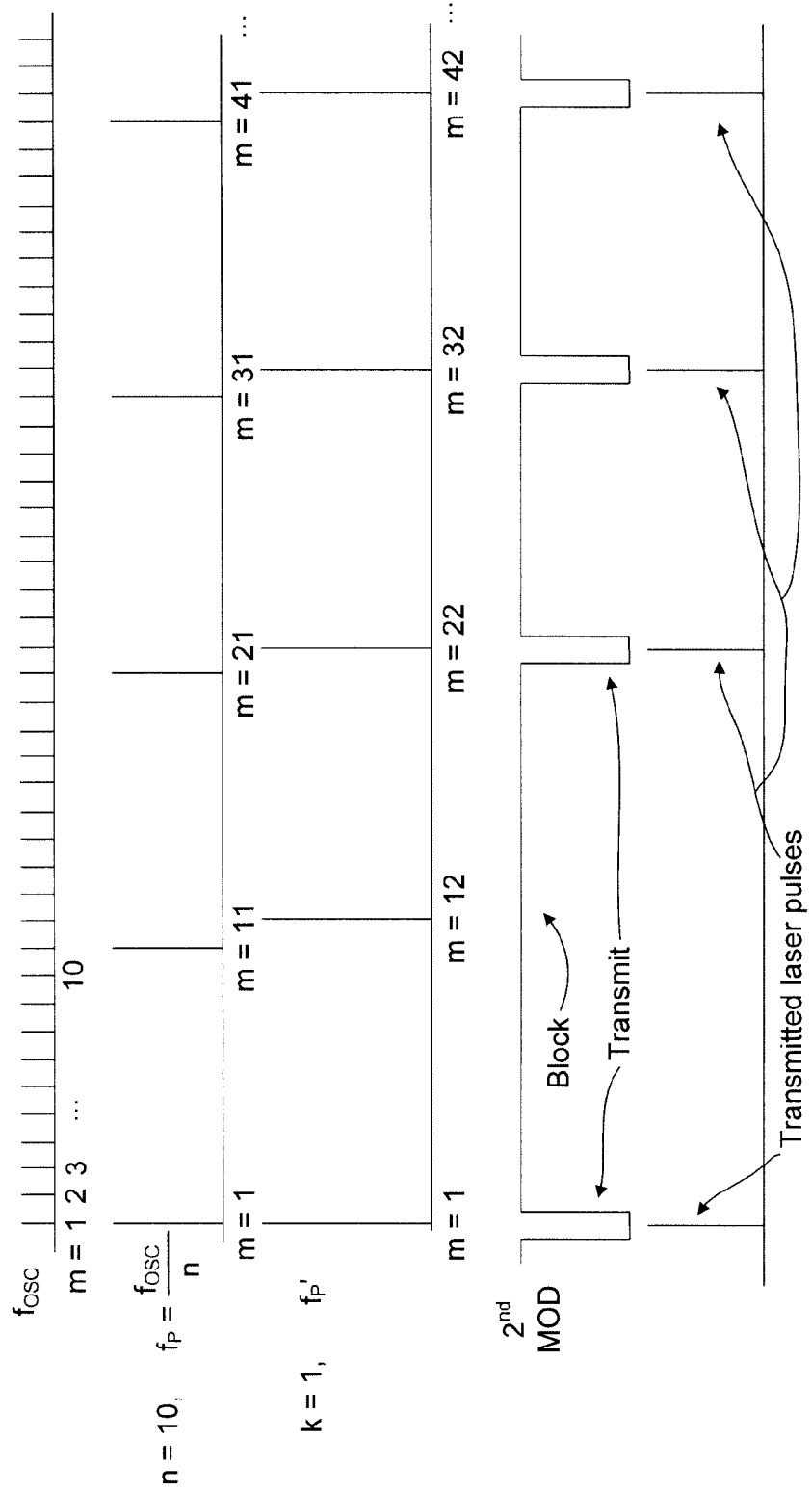
FIG. 5 graphically illustrates the use of a vector process comb according to one embodiment.

FIG. 5 graphically illustrates the use of a vector process comb according to one embodiment. As shown the photonic oscillator 216 provides a series of pulses 510 at a first PRF $f_{OSC}$. The time between successive pulses 510 (interpulse period) may be on the order of approximately 1 nanosecond to approximately 100 nanoseconds. Interpulse periods greater than approximately 100 nanoseconds may also be used. Those skilled in the art will further appreciate that very compact oscillators with interpulse periods of less than approximately 1 nanosecond may also be used. At these speeds, it may be difficult or impossible for the beam positioning system (e.g., the X-Y controller 110) to accurately align particular targets on the workpiece 118 with the laser beam 210. Further, it may be difficult or impossible for the amplifier 220 to efficiently amplify each pulse provided by the photonic oscillator 216. Thus, the first optical modulator 218 operates at a second PRF $f_P$ to select every $n^{th}$ pulse for transmitting to the workpiece 118. The second PRF $f_P=f_{OSC}/n$. In the example shown in FIG. 5, the process frequency index n=10 such that transmitted pulses (e.g., when there is no position compensation by incrementing the laser comb index k) correspond to oscillator frequency comb pulses m=11, m=21, m=31, and so forth. An artisan will recognize from the disclosure herein that any other integer value may also be used for the process frequency index n. The process frequency index n may be chosen, for example, such that the X-Y positioner 110 is capable of moving between targets at the second PRF $f_P$ while maintaining the positioning error within predetermined limits.

As further shown in FIG. 5, the laser comb index k may be incremented between two successive pulses by an integer photonic oscillator interpulse interval without modifying of the laser PRF (e.g., $f_P$) commanded by the system control computer 112. In this example, the laser comb index k is incremented from k=0 to k=1 after a first pulse m=1 is transmitted by the first optical modulator 218 for amplification. Because n=10 is unchanged, there are still 10 pulses emitted from the photonic oscillator 216 between each of the pulses m=12, m=22, m=32, m=42 . . . corresponding to the offset process frequency $f_P'$. Thus, incrementing the laser comb index k after the first pulse m=1 time shifts the succeeding pulses m=12, m=22, m=32, m=42 . . . transmitted by the first optical modulator 218 in the process comb by an integer value of $1/f_{OSC}$, while the new PRF $f_P'$ at which working pulses are emitted is equal to $f_P$.

Referring again to FIG. 4D, the method 328 may also include selectively blocking 428 a first pulse m=12 incident on the second optical modulator 226 after incrementing the laser comb index k for pulse amplitude stabilization. Using the second optical modulator 226 to block the first pulse m=12 allows for a settling interval to enable pulse amplitude stabilization following laser comb indexing in which an interpulse period was longer (or shorter) than $1/f_P$.

Incrementing the laser comb index k between two successive pulses results in a laser beam shift at the work surface= (shift in k)*(beam positioner velocity*$(1/f_{OSC})$). As an illustrative numerical example, if $f_{OSC}$=10 MHZ, $f_P$=1 MHz and the beam positioner velocity=500 nm/μs, a shift of k=1 (say from pulse m=10 to pulse m=11) results in a work surface shift of (500 nm/μs×0.1 μs)=50 nm. If in the same example, we had used a $f_{OSC}$=100 MHz, the work surface shift=5 nm. These values represent a laser comb augmentation capability that may further assist the beam displacement and other positioning elements to enable working laser pulses to intercept assigned workpiece target locations. As those skilled in the art will recognize, bursts of pulses at PRF $f_P$ may be alternatively employed and laser comb indexed, as commanded by embedded control computer in coordination with the beam position controller 116.

An artisan will recognize from the disclosure herein that any of the embodiments disclosed herein for position error compensation may be combined to improve speed and accuracy. Further, position error compensation is not limited to the embodiments shown in FIGS. 4A, 4B, 4C, 4D, and 5. For example, in another embodiment, servo tracking error may be driven to near-zero through the use of a repetitive control algorithm through employment of a resonator stage. In this embodiment, target runs are made at high velocity and high acceleration. The chuck stage repeats precisely the same motion (no gap profiling) so that iterative learning algorithms can reduce repeatable errors to within satisfactory tolerances. Further compensation can then be employed using beam compensation elements, as described above.

In addition, or in other embodiments, beam deflection elements (e.g., the AOD 230 or FSM 232) may steer the beam 210 to correct for velocity error that is integrated with time. If the velocity is too slow, then the system 200 system may skip a laser pulse to stay within the deflection range of the beam steering device. If the velocity is too high, such that the system 200 runs out of range on the deflection device, the system 200 may process certain links on a first run and then perform a second or additional runs to process other targets. This may not be desirable because it generally increases processing time. Thus, in some embodiments the system 200 may process a link run slower than the product of PRF*target pitch such that worst case velocity never exceeds PRF*pitch.

In a separate embodiment, single or multiple output pulses from the photonic oscillator 216 may be directly employed in processes where photonic oscillator output energy per pulse is sufficient for efficient photonic comb laser processing of workpieces.

V. Example Swath Processing

The systems and methods described herein may be used in a swath processing embodiment wherein pulses may be deflect along a row, or among adjacent rows, of target structures on a workpiece on-the-fly. As discussed above, the photonic oscillator 216 shown in FIG. 2 provides pulses at a high PRF (e.g., from tens of kHz to a few MHz) that may be directed by beam positioning elements (e.g., the AOD 230, the FSM 232, and/or the laser comb indexing module 234) in a moving processing window.

Figure 6:
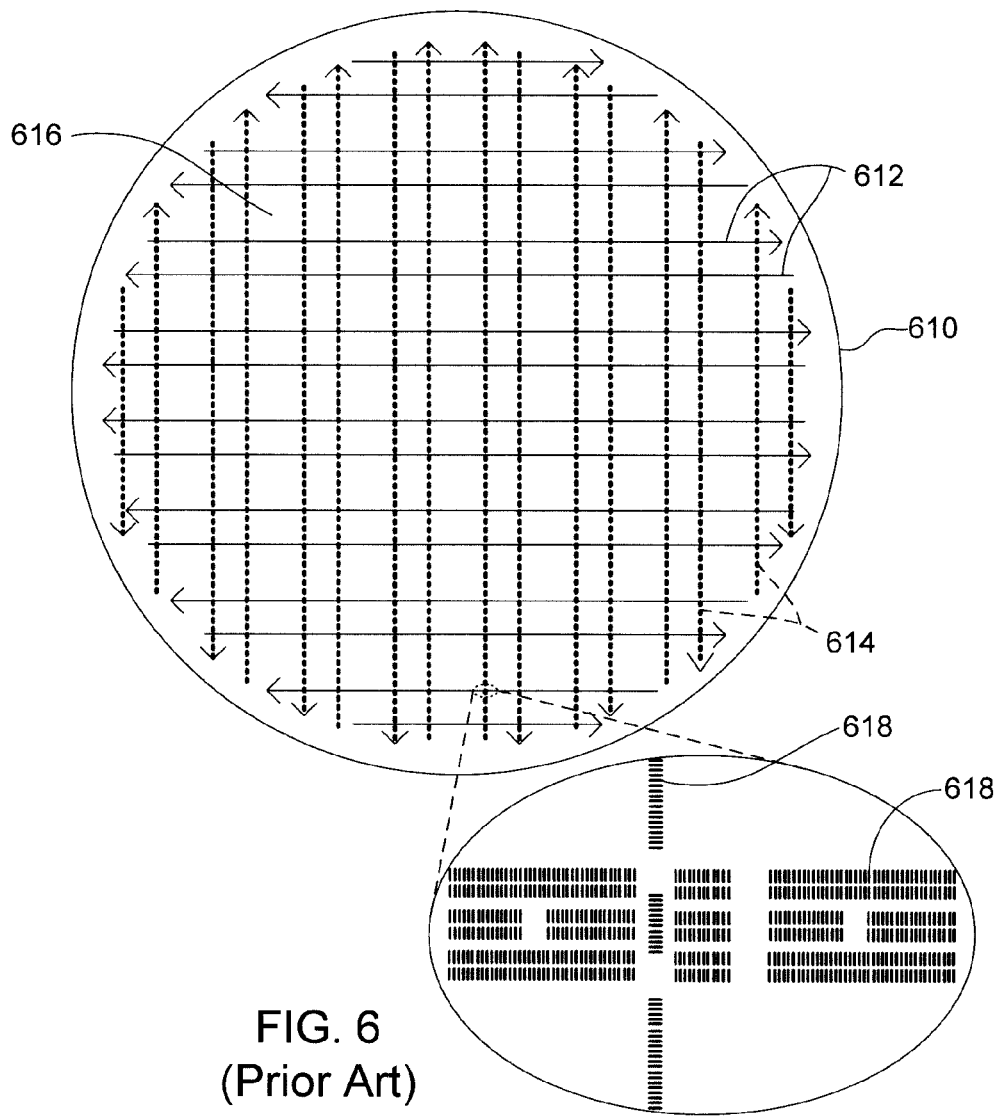
FIG. 6 depicts the processing of a wafer.

By way of example, FIG. 6 depicts the processing of a wafer 610. A conventional sequential link blowing process requires scanning the X-Y motion stage 110 across the wafer 610 once for each link run. Repeatedly scanning back and forth across the wafer 610 results in complete wafer processing. A machine typically scans back and forth processing all X-axis link runs 612 (shown with solid lines) before processing the Y-axis link runs 614 (shown in dashed lines). This example is merely illustrative. Other configurations of link runs and processing modalities are possible. For example, it is possible to process links by moving the wafer or optics rail. In addition, link banks and link runs may not be processed with continuous motion.

For a wafer 610 comprising DRAM, for example, memory cells (not shown) may be located in the areas 616 between the X-axis link runs 612 and the Y-axis link runs 614. For illustrative purposes, a portion of the wafer 610 near an intersection of an X-axis link run 612 and a Y-axis link run 614 is magnified to illustrate a plurality of links 618 arranged in groups or link banks. Generally, the link banks are near the center of a die, near decoder circuitry, and not above any of the array of memory cells. The links 618 cover a relatively small area of the total wafer 610.

Figure 7:
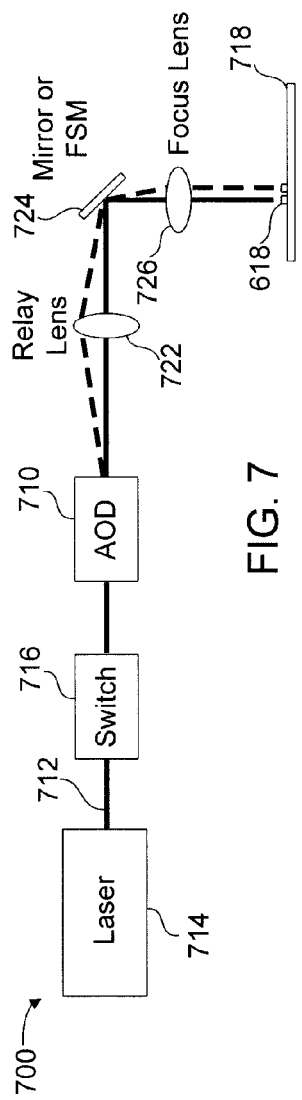
FIG. 7 is a schematic diagram of a laser processing system comprising an AOD according to one embodiment.
Figure 10:
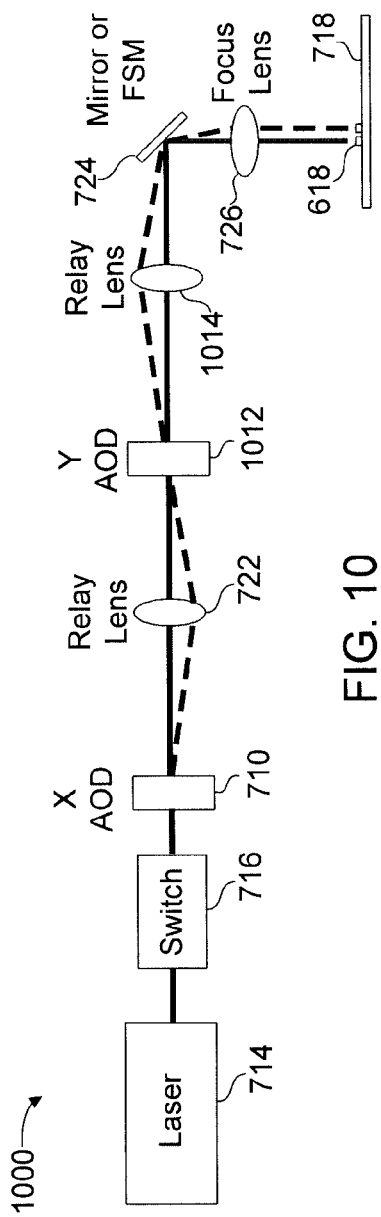
FIG. 10 is a schematic diagram of a laser processing system comprising two deflection devices according to one embodiment.
Figure 11:
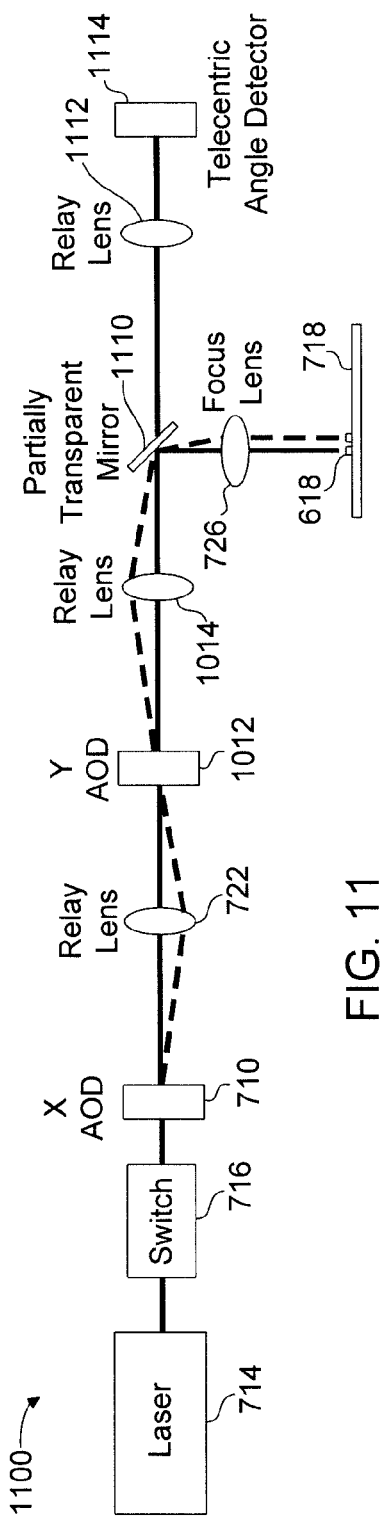
FIG. 11 is a schematic diagram of a laser processing system including a telecentric angle detector according to one embodiment.

FIGS. 7, 10 and 11 provide example alternative embodiments for swath processing and are provided for illustrative purposes. One skilled in the art will recognize that the principles of swath processing discussed in relation to FIGS. 7, 10 and 11 may be applied to the other embodiments (e.g., FIG. 2) discussed herein.

FIG. 7 is a schematic diagram of a laser processing system 700 comprising an AOD 710 according to one embodiment. The AOD 710 comprises a very high speed device configured to deflect a pulsed laser beam 712 emitted by a laser 714 such that two sequential pulses may be delivered to two different links in two laterally spaced link banks. In one embodiment, the AOD 710 is configured to deflect laser pulses in one dimension (e.g., perpendicular to a scanning direction). In another embodiment, the AOD 710 is configured to deflect laser pulses in two dimensions (e.g., perpendicular to a scanning direction and parallel to the scanning direction). In other embodiments, two AODs are used to provide deflection in a two dimensions.

In one embodiment, the laser processing system 700 also includes a switch 716 configured to allow or block laser pulses from reaching a workpiece 718 (e.g., a semiconductor wafer including a plurality of links). The switch 716 may include an AOD or acousto-optic modulator (AOM) device. In one embodiment, however, the switch 716 and the AOD 710 comprise a single device configured to selectively direct the pulsed laser beam 712 to a beam dump (not shown) to block laser pulses from reaching the workpiece 718.

As also shown in FIG. 7, the laser processing system 700 may also include a relay lens 722 to direct differently deflected beam paths (illustrated exiting the AOD 710 as a solid line and a dashed line) to a same location on a mirror 724 (or other redirection device such as an FSM) corresponding to an entrance pupil of a focus lens 726. In operation, different deflection angles provided by the AOD 710 result in different pulses being directed to different locations on the workpiece 718. Although not shown, in one embodiment, a controller configured to execute instructions stored on a computer readable medium controls the AOD 710 so as to selectively deflect a sequence of laser pulses to desired locations on the workpiece 718.

An artisan will recognize from the disclosure herein that the system 700 is provided by way of example and that other system configurations are possible. Indeed, various other example system embodiments are provided below.

Figure 8:
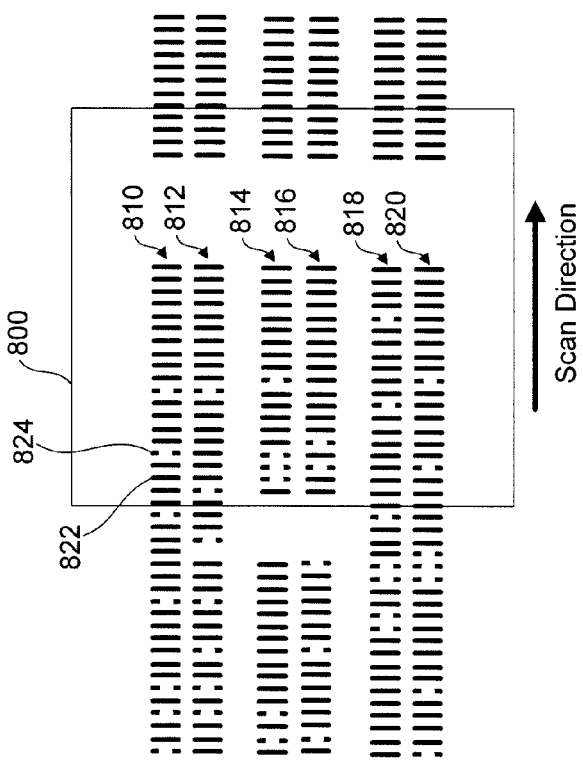
FIG. 8 is a schematic diagram illustrating a processing window scanning across a plurality of laterally spaced link banks according to one embodiment.

FIG. 8 is a schematic diagram illustrating a processing window 800 scanning across a plurality of laterally spaced link banks 810, 812, 814, 816, 818, 820 according to one embodiment. Each link bank 810, 812, 814, 816, 818, 820 includes a plurality of links 822 that are not severed and a plurality of links 824 that are severed by a series of laser pulses as the processing window 800 scans across the plurality of link banks 810, 812, 814, 816, 818, 820.

In one embodiment, a laser processing system 700 is configured to sever any link 822, 824 within the moving processing window 800. Thus, rather than using six individual link runs to process the six link banks 810, 812, 814, 816, 818, 820 included in the example shown in FIG. 8, the system 700 processes all six link banks 810, 812, 814, 816, 818, 820 in a single pass, greatly improving system throughput. In one embodiment, for example, a system including a 100 kHz laser provided through a single beam path, a 50 μm×50 μm processing window, and a low performance stage (e.g., 1 G accelerations per axis and 20 ms settle times), may have an increased throughput that is two to three times that of conventional link processing systems. Such a system would be competitive with a dual-beam system including a high PRF laser (e.g., 300 kHz) and a high performance stage (e.g., 1 m/second link runs, 5 G accelerations, and 0.001 second settle times). It may be significantly easier and cheaper to build the system having the lower performance stage. Further, the single beam system may be easier and cheaper to build than the dual-beam system.

In one embodiment, the processing window 800 scans across the plurality of link banks 810, 812, 814, 816, 818, 820 in a substantially continuous motion as the plurality of links 824 are severed. In another embodiment, the processing window 800 steps across the plurality of link banks 810, 812, 814, 816, 818, 820 in a series of discrete movements. In one such embodiment, the processing window comprises two mutually exclusive sets of links 822, 824 between each step or hop. Thus, the system 700 may process a first set of links 822, 824 in both on-axis and cross-axis directions within the processing window 800 at a first location before the processing window 800 moves to a second location that includes a second (and different) set of links. In another embodiment, the processing window 800 takes smaller steps in the scan direction such that when one group (e.g., one column) of links 822, 824 corresponding to respective link banks 810, 812, 814, 816, 818, 820 enters the scanning window 800 during a step, another group of links 822, 824 exits the scanning window 800. Thus, the system 700 processes a group or column of laterally spaced links 822, 824 in different link banks 810, 812, 814, 816, 818, 820 between each step.

An artisan will understand from the disclosure herein that, depending on the relative sizes of the processing window 800 and the link banks 810, 812, 814, 816, 818, 820, the system 700 may process more than six link banks in a single pass. Further, the system 700 may process less than six link banks in a single pass, including, for example, processing a single link bank in a single pass.

An artisan will also understand from the disclosure herein that the system 700 is not limited to processing substantially parallel, laterally spaced link banks 810, 812, 814, 816, 818, 820 within the processing window 800. Indeed, the links 822, 824 passing through the processing window 800 may be arranged in any pattern. The severed links 824 may also be severed in any sequence. Further, while FIG. 8 shows a uniform scan direction in the X-direction (horizontal), the scan direction may also be in the Y-direction (vertical), a combination of X and Y directions, and/or a random pattern around the XY plane of a wafer. In one embodiment, the scan direction is selected so as to optimize throughput.

Figure 9:
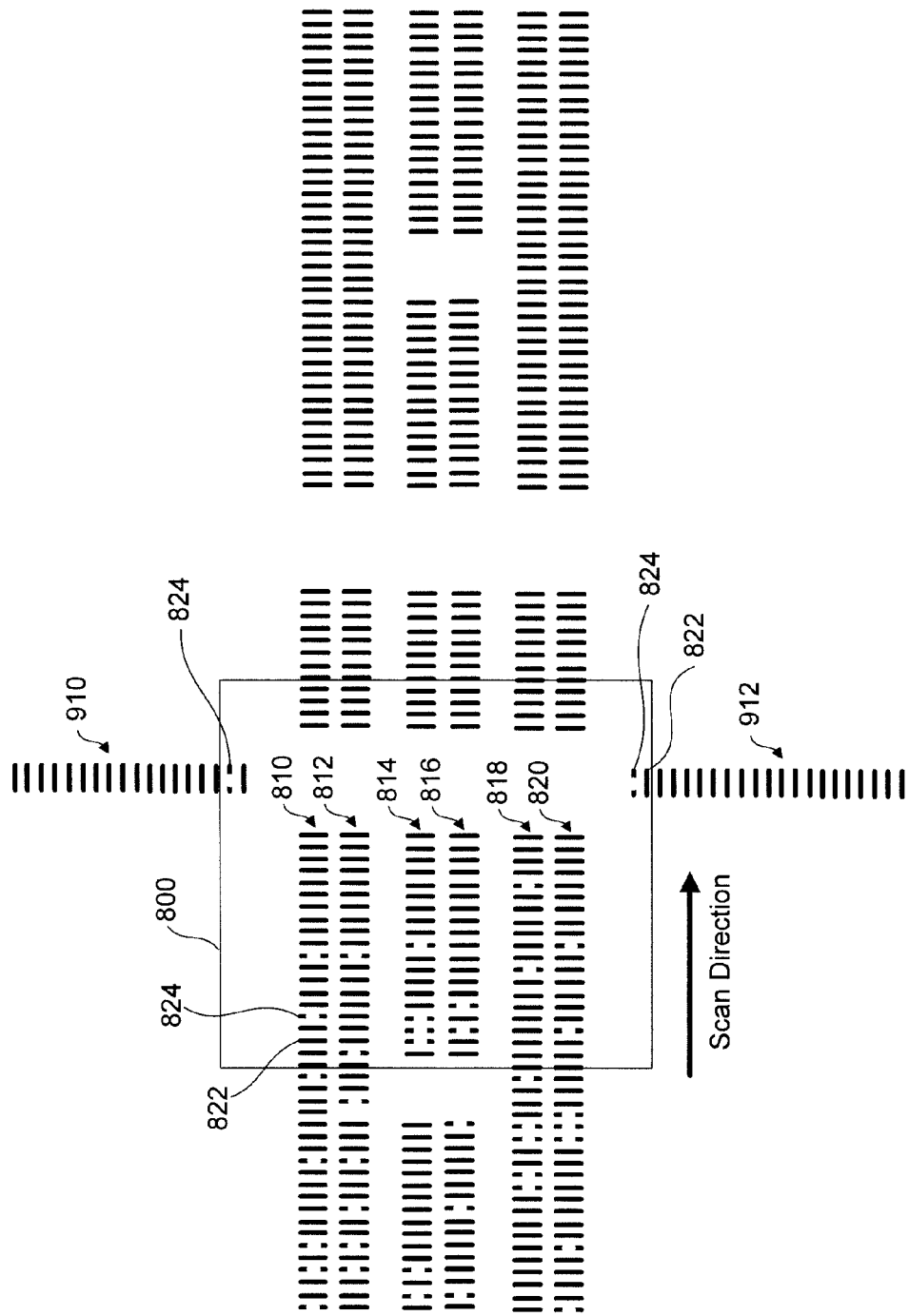
FIG. 9 is a schematic diagram illustrating a processing window scanning across a plurality of laterally spaced link banks extending along an X-axis and a plurality of link banks extending along a Y-axis according to one embodiment.

For example, FIG. 9 is a schematic diagram illustrating a processing window 800 scanning across a plurality of laterally spaced link banks 810, 812, 814, 816, 818, 820 extending along an X-axis and a plurality of link banks 910, 912 extending along a Y-axis according to one embodiment. In a single pass of the processing window 800 over the laterally spaced link banks 810, 812, 814, 816, 818, 820 extending along the X-axis, the processing window 800 also passes over at least a portion of the links 822, 824 in the plurality of link banks 910, 912 extending along the Y-axis. Again, as shown in FIG. 9, the system 700 may selectively sever any of the links 822, 824 passing through the processing window 800.

In one embodiment, the system 700 sorts and orders the sequence of link blows within the processing window 800 so as to maximize or increase throughput. To achieve this maximized or increased throughput, the system 700 also calculates a stage velocity that is compatible with the size of the processing window 800, the number of links 822, 824 within the processing window 800 to be blown at any given time, and the sequence of link blows. In one such embodiment, the system 700 selects a stage velocity so as to reduce the number of blocked pulses. The stage velocity may also be selected to ensure that every link intended to be blown is blown in a single pass of the processing window 800. In one embodiment, the stage velocity may be constant.

In other embodiments, the stage velocity may vary based on the number of links 824 to be blown currently passing through the processing window 800. For example, when fewer links 824 to be blown are passing through the processing window 800, the system 700 may increase the stage velocity. When more links 822, 824 to be blown are passing through the processing window 800, the system 700 may decrease the stage velocity.

In one embodiment, a maximum stage velocity $V_{SMAX}$ is determined by finding the maximum number of links ($N_{MAX}$) within the processing window 800 over a group of link runs. For example, the maximum stage velocity $V_{SMAX}$ may be set to the width ($AOD_{width}$) of the processing window 800 multiplied by the PRF divided by $N_{MAX}$. This provides a good estimate for the maximum stage velocity $V_{SMAX}$. However, in one embodiment, the system 700 takes into account possible "queueing" of the links 822, 824 in the processing window 800, which provides a buffer for unprocessed links over short sections of the link runs when the velocity exceeds the above limit. Depending on the density of the link runs, such queueing may increase the stage velocity in a range between approximately 50% and approximately 100%. This improvement may be diluted in some embodiments by acceleration/deceleration times and overhead. In one embodiment, using queuing to determine the maximum stage velocity $V_{SMAX}$ is an iterative process wherein an overflow of a "link queue" becomes very non-linear as a true maximum velocity is approached. In such embodiments, more linearity may be introduced by, for example, filtering the link density, calculating a "link flow" for a given velocity, and calculating an allowable "accumulation" in the processing window 800 given a maximum "processing flow" (PRF multiplied by the link pitch).

To sever any link 824 within the moving processing window 800, the positioning accuracy of the AOD 710 shown in FIG. 7 is sufficiently small so as to maintain system accuracy over the entire processing window 800. Present high numeric aperture lenses have a scan field of approximately 50 μm. Further, it may be desirable to have a system link blow accuracy that is better than mean plus 3 sigma <0.18 μm. If, for example, the AOD 710 contributes approximately 20 nm of system inaccuracy to an error budget, then the AOD 710 according to one embodiment has a positioning accuracy of approximately 1 part in 2500.

FIG. 10 is a schematic diagram of a laser processing system 1000 comprising two deflection devices according to one embodiment. The system 1000 includes the laser 714, switch 716, AOD 710, relay lens 722, mirror 724, and focus lens 726 discussed in relation to FIG. 7. However, the system 1000 also includes another AOD 1012 and another relay lens 1014 in the beam path.

In one embodiment, the AOD 710 is configured to deflect the laser beam in the X-direction and the AOD 1012 is configured to deflect the laser beam in the Y-direction. The relay lens 722 images the laser beam from the AOD 710 to the AOD 1012. The relay lens 1014 images the laser beam from the AOD 1012 to the mirror 724. Thus, the system 1000 may redirect laser pulses in two directions. In one embodiment, however, the AOD 710 shown in FIG. 7 comprises a single device capable of deflecting the laser beam in two directions.

FIG. 11 is a schematic diagram of a laser processing system 1100 including a telecentric angle detector 1114 according to one embodiment. In this embodiment, a partially transparent mirror 1110 directs a portion of the laser beam to the focus lens 726 and a portion of the laser beam to the telecentric angle detector 1114 through an additional relay lens 1112. The telecentric angle detector 1114 may include a quad cell, a PSD, or a camera detector configured to detect beam angle. As discussed above, the telecentric angle detector 1114 may be used to provide feedback to one or both of the AODs 710, 1012 for error correction and/or calibration.

In one embodiment, the system 700 processes the individual links 824 in the processing window 800 using a single pulse to blow each link 824. The AOD 710 quickly redirects the position of the focused link pulses to links 824 within the processing window 800 between two sequential laser pulses as the processing window 800 travels in the scan direction. While a conventional link processing system may block approximately one-half to approximately 99% of the pulses produced by a very high PRF laser, the system 700 may use most or all of the pulses. Thus, throughput may be greatly increased without moving the workpiece 718 faster.

In addition, or in another embodiment, the system 700 may process a single location on the workpiece 718 with two or more pulses before using the AOD 710 to direct subsequent pulses to other locations on the workpiece 718. The system 700 may provide ten, for example, lower energy pulses to a link 824 before redirecting the laser beam to a different location on the workpiece 718. Thus, the system 700 provides an effective way of directing pulses produced at a very high PRF (e.g., in a range between approximately 1 MHz and approximately 100 MHz) to target desired links 824 with many blows.

If the processing window 800 moves continuously with respect to the workpiece 718, the AOD 710 may be used to track according to one embodiment so as to maintain a stationary relationship between a focused spot location and a link position while one or more pulses are delivered to the link 824. Tracking may also be used to maintain a stationary relationship with a plurality of laterally spaced links.

In one embodiment, switching times between locations on the workpiece 718 are less than one laser pulse period. In another embodiment, the switching time is on the order of the laser pulse period. In other embodiments, the switching time is longer than the switching pulse period. Thus, the laser 714 is effectively used if, for example, the system 700 processes links 824 with ten laser pulses and switches from one link to the next in three or four laser pulse periods.

Rather than delivering all ten pulses (in the example above) to a single link 822, 824 before switching to a new location (e.g., as the processing window 800 advances in the scan direction shown in FIGS. 8 and 9), two or more of the pulses may be delivered to two or more laterally spaced links 822, 824 (e.g., spaced perpendicular to the scan direction). For example, it may be desirable to deliver a single pulse to each of six laterally spaced links 822 (one in each of the link banks 810, 812, 814, 816, 818, 820 shown in FIG. 8). Thus, the AOD 710 may deflect six sequential laser pulses to the six laterally spaced links 822 before shifting the processing window 800 to a new location.

Figure 12A:
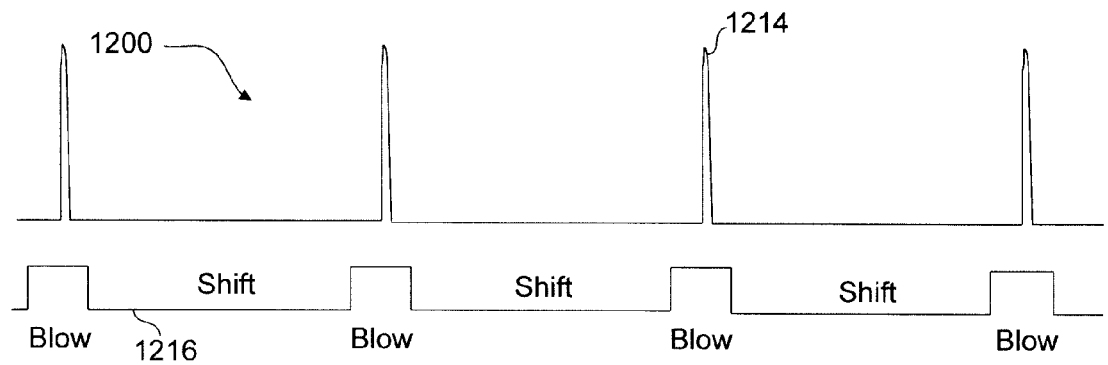
FIGS. 12A, 12B and 12C are timing diagrams illustrating a series of laser pulses in relation to respective repositioning profiles according to certain embodiments.
Figure 12B:
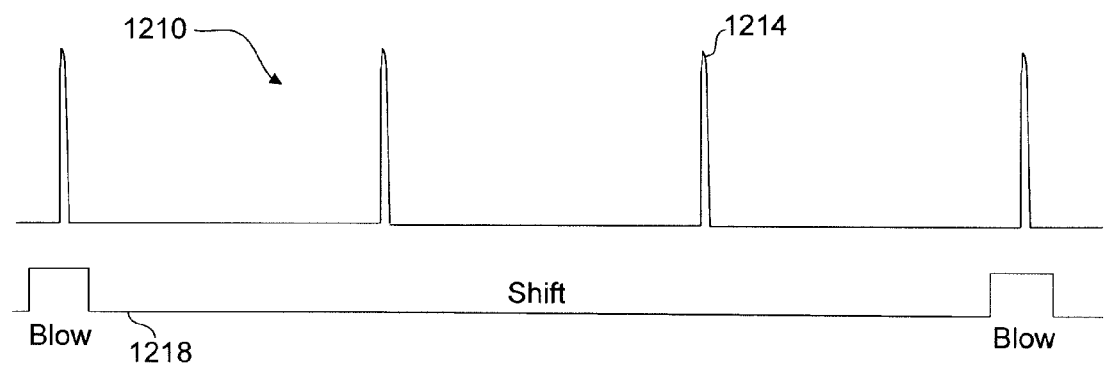
Figure 12C:
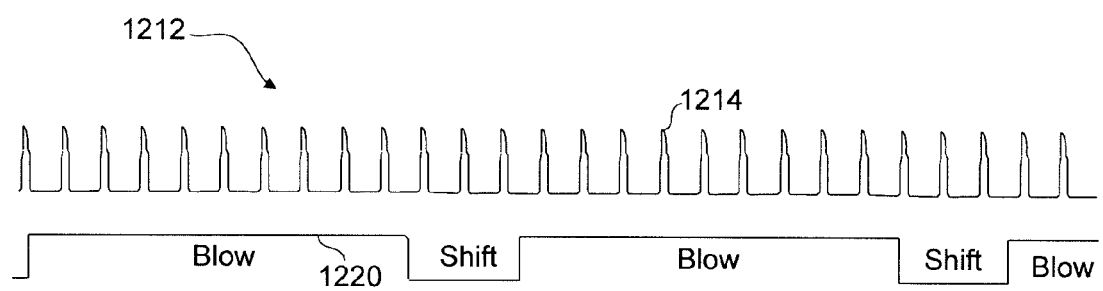

FIGS. 12A, 12B and 12C are timing diagrams 1200, 1210, 1212 illustrating a series of laser pulses 1214 in relation to respective repositioning profiles 1216, 1218, 1220 according to certain embodiments. An artisan will understand from the disclosure herein that the timing diagrams 1200, 1210, 1212 shown in FIGS. 12A, 12B and 12C are provided by way of example only and that any combination of pulses delivered per link and pulse periods used to shift between links may be used. In the embodiment shown in FIG. 12A, a single laser pulse is delivered to a link during a blow period. An AOD or a high speed beam deflector (not shown), for example, is then shifted or repositioned between each pulse during a shift period. Thus, in this example, each laser pulse in the series of laser pulses 1214 is delivered to a different link.

In the embodiment shown in FIG. 12B, the AOD or high speed beam deflector uses more time, as compared to the example in FIG. 12A, to shift between each blow period. Specifically, after a first pulse is delivered to a first link, the AOD or high speed beam deflector shifts during three pulse periods before a second pulse is delivered to a second link. As discussed below, a switch (e.g., an additional AOD and a beam dump) may be used block the unused laser pulses from reaching the surface of the workpiece during the shift period.

In the embodiment shown in FIG. 12C, a first plurality of pulses (nine shown) are delivered to a first link during a first blow period, the AOD or high speed beam deflector shifts during a few pulse periods (approximately three shown), and a second plurality of pulses are delivered to a second link during a second blow period. In one embodiment, however, two or more of the first (and/or second) plurality of pulses may distributed among a plurality of laterally spaced links during the first (and/or second) blow periods using a high speed deflection device such as the AOD 710 discussed above. Thus, pulses may be efficiently distributed so as to utilize as many of the pulses in the series of laser pulses 1214 as possible. In one embodiment, the number of pulses used increases by more than approximately 1% as compared to pulses utilized by conventional link processing systems.

Coherent crosstalk may be a problem for laser spots directed to process the same target on the work surface in areas that either fully or partially overlap, laser spots that overlap separate targets on the work surface such that any portion of the beam (e.g., Gaussian tails) overlap, or laser spots that overlap at a detector such as a pulse energy or reflected pulse energy detector. When Gaussian tails of different laser spots overlap, for example, crosstalk and interference in the region between two nearby structures (e.g., links) may result in damage caused by undesirably high optical energy levels. Thus, in the embodiments discussed above, a single laser spot is incident within a processing window on a workpiece at a time. Two sequential laser spots configured to spatially overlap on the workpiece do not interfere with each other, thereby reducing or eliminating coherent crosstalk. However, in other embodiments, multiple spots may be incident within the processing window on the workpiece at the same time. For example, two or more laser beams may be provided through two or more beam paths.

While processing a site with one or multiple blows, it is desirable to use the high speed beam steering mechanism to steer the focused spot for several reasons.

First, it is necessary to do beam deflection to switch between different link blow locations. Next, in a system in which the process area moves continuously relative to the workpiece, it may be desirable to include a tracking command. This command could help maintain a stationary relationship between the focused spot position and the link position while one or more laser pulses are delivered to the link. A tracking command is particularly useful if multiple pulses are to be targeted at one link.

Additional beam deflection or steering can be used to compensate for tracking errors in motion stages. For example, if a planar XY stage is used to position the wafer under the focused laser spot, then residual XY stage tracking error (the instantaneous difference between desired trajectory and actual trajectory) can be compensated for using beam steering. This is similar to our FSM error compensation.

It is also possible to use the steering mechanism to correct for other types of system errors or disturbances. For example, in the 9830 platform we sense motion of the final focus objective and correct for the resultant motion of the spot at the workpiece using the FSM. This could be done using the same steering mechanism. We could also compensate for beam pointing errors, such as sensed inaccuracy in the pointing stability of the laser rail. And, other errors such as thermal drift can be corrected using this steering mechanism.

The net tracking or steering command delivered to the AOM, EOM, or other steering mechanism is a superposition or addition of one or more of the above steering terms. There may also be other desirable reasons to steer beams not noted above.

The positioning accuracy high speed beam steering device must, in one embodiment, be small enough to maintain system accuracy over the processing area. Present high numeric aperture lenses have a scan field of approximately 50 microns, and system link blow accuracy is better than mean plus 3 sigma <0.18 nm. If the AOD is allowed to contribute 20 nm of system inaccuracy to the error budget, then it would need the ability to position with an accuracy of about 1 part in 2500. This is a reasonable desire. It may be desirable to drive the AOM or high speed beam steering device with some closed-loop sensing and feedback correction.

One way to do this would be to use the AOD to deflect unwanted pulses to a beam dump that includes a position sensitive detector or quad cell that can measure the position of these unused pulses. Thermal drifts or changes in AOM calibration can be detected by this technique.

It may also be possible to shoot additional beams through the AOM and measure how they are deflected. For example, in addition to the cutting laser, a helium neon CW laser could be directed through the AOM and some of the resulting deflected CW beam could be directed at a PSD or quad cell for feedback purposes or for detecting drift.

It will be understood by those having skill in the art that many changes may be made to the details of the above-described embodiments without departing from the underlying principles of the invention. The scope of the present invention should, therefore, be determined only by the following claims.

The invention claimed is:

1. A method for processing a workpiece with a laser, the method comprising:
generating laser pulses at a first pulse repetition frequency, the first pulse repetition frequency providing reference timing for coordination of a beam positioning system and one or more cooperating beam position compensation elements to align beam delivery coordinates relative to the workpiece;
at a second pulse repetition frequency that is lower than the first pulse repetition frequency, selectively amplifying a subset of the laser pulses, wherein selection of the laser pulses included in the subset is based on the first pulse repetition frequency and position data received from the beam positioning system; and
adjusting the beam delivery coordinates using the one or more cooperating beam position compensation elements so as to direct the amplified laser pulses to selected targets on the workpiece.

2. The method of claim 1, further comprising:
measuring a position of the beam positioning system;
comparing the measured position to an expected position; and
providing the comparison as a position compensation signal.

3. The method of claim 2, wherein adjusting the beam delivery coordinates comprises adjusting at least one of an acousto-optic deflector and a fast steering mirror based on the position compensation signal.

4. The method of claim 2, wherein adjusting the beam delivery coordinates comprises adjusting at least one of an electro-optic deflector and a fast steering mirror based on the position compensation signal.

5. The method of claim 1, further comprising selecting the second pulse repetition frequency such that the first pulse repetition frequency is an integer multiple "n" of the second pulse repetition frequency.

6. The method of claim 5, wherein adjusting the beam delivery coordinates comprises offsetting an interpulse time between a first amplified pulse in the subset and a second amplified pulse in the subset by an integer multiple k of the photonic oscillator interpulse time based on the amount of beam delivery coordinate adjustment.

7. The method of claim 6, further comprising blocking the second amplified pulse from reaching the workpiece.

8. The method of claim 1, wherein adjusting the beam delivery coordinates comprises adjusting at least one of an acousto-optic deflector, an electro-optic modulator, a fast steering mirror, and an interpulse time between a first amplified pulse in the subset and a second amplified pulse in the subset by an integer multiple k of the photonic oscillator interpulse time.

9. A system for processing a workpiece with a beam of laser pulses, the system comprising:
   a beam positioning system to align beam delivery coordinates relative to the workpiece, the beam positioning system generating position data corresponding to the alignment;
   one or more cooperating beam position compensation elements to adjust the alignment of the beam delivery coordinates based on the position data; and
   a pulsed laser source comprising:
      a photonic oscillator to emit laser pulses at a first pulse repetition frequency, the first pulse repetition frequency providing a reference timing signal for coordination of the beam positioning system and the one or more cooperating beam position compensation elements for the alignment of the beam delivery coordinates relative to the workpiece; and
      a first optical modulator to select, at a second pulse repetition frequency that is lower than the first pulse repetition frequency, a subset of the laser pulses for amplification, wherein the selection of the laser pulses included in the subset is based on the first pulse repetition frequency and the position data.

10. The system of claim 9, wherein the pulsed laser source comprises a diode-pumped mode-locked master oscillator power amplifier.

11. The system of claim 9, wherein the pulsed laser source comprises a diode-pumped mode-locked master oscillator regenerative amplifier.

12. The system of claim 9, wherein the pulsed laser source comprises a tandem photonic amplifier.

13. The system of claim 12, wherein the tandem photonic amplifier comprises a diode-pumped ultrafast fiber master oscillator.

14. The system of claim 9, wherein the photonic oscillator comprises an internal clock configured to provide the reference timing signal at the first pulse repetition frequency used to determine which pulses to select for amplification and to adjust the beam positioning elements.

15. The system of claim 9, wherein the one or more cooperating beam position compensation elements comprise at least one of an acousto-optic deflector, an electro-optic deflector, and a fast-steering mirror.

16. The system of claim 9, wherein the one or more cooperating beam position compensation elements comprise a laser comb indexing module configured to:
   select the second pulse repetition frequency such that the first pulse repetition frequency is an integer multiple n of the second pulse repetition frequency; and
   offsetting an interpulse time between a first amplified pulse in the subset and a second amplified pulse in the subset by an integer multiple k of the photonic oscillator interpulse time based on the amount of beam delivery coordinate adjustment.

17. The system of claim 16, further comprising a second optical modulator to block the second amplified pulse from reaching the workpiece.

18. A system for processing a workpiece with a beam of laser pulses, the system comprising:
   means for generating laser pulses at a first pulse repetition frequency, the first pulse repetition frequency providing a reference timing signal for coordination of a beam positioning system and one or more cooperating beam position compensation elements for alignment of beam delivery coordinates relative to the workpiece; and
   a first pulse selection means to select, at a second pulse repetition frequency that is lower than the first pulse repetition frequency, a subset of the laser pulses for amplification.

19. The system of claim 18 further comprising:
   means for selecting the second pulse repetition frequency such that the first pulse repetition frequency is an integer multiple n of the second pulse repetition frequency; and
   means for offsetting an interpulse time between a first amplified pulse in the subset and a second amplified pulse in the subset by an integer multiple k of the photonic oscillator interpulse time based on the amount of beam delivery coordinate adjustment.

20. The system of claim 19 further comprising a second pulse selection means to block the second pulse from reaching the workpiece.

21. The system of claim 20, wherein at least one of the first pulse selection means and the second pulse selection means is selected from the group comprising an acousto-optic modulator and an electro-optic modulator.

* * * * *